United States Patent
Cui et al.

(10) Patent No.: US 9,648,306 B1
(45) Date of Patent: May 9, 2017

(54) METHOD FOR ALIGNING AND ASSEMBLING STEREOSCOPIC DISPLAY AND MANUFACTURING EQUIPMENT FOR THE SAME

(71) Applicant: Wuhan China Star Optoelectronics Technology Co., Ltd., Wuhan, Hubei (CN)

(72) Inventors: Hongqing Cui, Guangdong (CN); Guowei Zha, Guangdong (CN)

(73) Assignee: Wuhan China Star Optoelectronics Technology Co., Ltd d, Wuhan, Hubei (CN)

( * ) Notice: Subject to any disclaimer, the term of this patent is extended or adjusted under 35 U.S.C. 154(b) by 0 days.

(21) Appl. No.: 15/214,678

(22) Filed: Jul. 20, 2016

(30) Foreign Application Priority Data

Mar. 23, 2016 (CN) .......................... 2016 1 0169381

(51) Int. Cl.
*G02B 27/22* (2006.01)
*H04N 13/04* (2006.01)

(52) U.S. Cl.
CPC ......... *H04N 13/04* (2013.01); *G02B 27/2214* (2013.01); *H04N 2213/001* (2013.01)

(58) Field of Classification Search
CPC ........................... H04N 13/04; G02B 27/2214
See application file for complete search history.

(56) References Cited

U.S. PATENT DOCUMENTS

2013/0182319 A1* 7/2013 Chung ............... G02B 27/2214
359/463

* cited by examiner

*Primary Examiner* — Joseph L Williams
(74) *Attorney, Agent, or Firm* — Andrew C. Cheng

(57) ABSTRACT

A method for aligning and assembling a stereoscopic display and manufacturing equipment are provided. Using an alignment imaging device to search alignment marks at non-display regions of a display panel and a cylindrical lens sheet. Determining a center coordinate of the display panel, a center coordinate of the cylindrical lens sheet, and an angle offset of the display panel and the cylindrical lens sheet. Using the center coordinate of the display panel and the center coordinate of the cylindrical lens sheet to perform a central assembling and aligning for the display panel and the cylindrical lens sheet. Respectively rotating the display panel and the cylindrical lens sheet according to the angle offset in order to finish assembling and aligning of the display panel and the cylindrical lens sheet.

10 Claims, 4 Drawing Sheets

METHOD FOR ALIGNING AND ASSEMBLING STEREOSCOPIC DISPLAY AND MANUFACTURING EQUIPMENT FOR THE SAME

BACKGROUND OF THE INVENTION

1. Field of the Invention

The present invention relates to a stereoscopic display field, and more particularly to a method for aligning and assembling stereoscopic display and manufacturing equipment for the same.

2. Description of Related Art

Comparing to a 2D picture, a 3D stereoscopic display technology can make a picture to be stereoscopic and lifelike. The picture is not limited to be at a flat surface of a screen such that a viewer has an immersive feeling. Wherein, for the naked eye 3D stereoscopic display technology, because a complicated auxiliary device is not required, the technology mimics the way that a human observes the world so that the technology represents a development direction of the new display technology.

A naked eye 3D display based on cylindrical lenses technology (as shown in FIG. 1) has advantages of simple and stable manufacturing process, thin thickness, standard lens shape, small cross-talk and so on. The thickness of the thin film is only 200 μm so that the technology can effectively decrease a height between the lens and a pixel, and has great advantage in small size and high PPI naked eye 3D display. The core technology is through changing a transmission path of light such that parallax images of left eye and right eye can respectively enter the left eye and right eye of a human. Wherein, a precise alignment between the pixel structure of the display panel and the 3D lens is the key for reducing the crosstalk of the left and right eyes and increasing the 3D display quality. A too large deviation of assembling and aligning will cause the human eye to be uncomfortable. The current assembling and aligning technology is based on an alignment mark technology of a single edge of two points or four points or multiple edges, which cannot fully meet the higher aligning and assembling requirement between the cylindrical lens and the display panel along the "horizontal direction", ie. along the left to right eyes direction.

SUMMARY OF THE INVENTION

The main technology problem solved by the present invention is to provide a method and equipment for realize a high precision of aligning and assembling of the display panel and the cylindrical lens sheet along the "horizontal direction".

In a first aspect, the embodiment of the present invention provides a method for aligning and assembling a stereoscopic display, comprising: using an alignment imaging device to search alignment marks at non-display regions of a display panel and a cylindrical lens sheet; determining a center coordinate of the display panel, a center coordinate of the cylindrical lens sheet, and an angle offset of the display panel and the cylindrical lens sheet; using the center coordinate of the display panel and the center coordinate of the cylindrical lens sheet to perform a central assembling and aligning for the display panel and the cylindrical lens sheet; and respectively rotating the display panel and the cylindrical lens sheet according to the angle offset in order to finish assembling and aligning of the display panel and the cylindrical lens sheet.

Wherein, each of the non-display region of the display panel and the non-display region of the cylindrical lens sheet includes six alignment marks, and the six alignment marks are respectively located at four terminals of diagonals and central positions of short edges of each of the display panel and the cylindrical lens sheet.

Wherein, the step of determining a center coordinate of the display panel, a center coordinate of the cylindrical lens sheet, and an angle offset of the display panel and the cylindrical lens sheet comprises: using the alignment imaging device to search two groups of the alignment marks at diagonal directions of each of the display panel and the cylindrical lens sheet; respectively determining center points of the two groups of the alignment marks, and averaging coordinates of the center points of the two groups of the alignment marks in order to obtain first mark points; searching the alignment marks at central positions of short edges of each of the display panel and cylindrical lens sheet, and using a center point between the alignment marks at central positions of the short edges of each of the display panel and cylindrical lens sheet as a second mark point; averaging coordinates of the first mark points and the second mark points in order to obtain a center coordinate of the display panel and a center coordinate of the cylindrical lens sheet; and determining two included angles between diagonals and long sides of the display panel and cylindrical lens sheet, and averaging the two included angles in order to obtain an angle offset.

Wherein, each of the alignment marks is a two-dimensional micro structure that has an optical contour enhancement character, or a metal mark adopting an opaque metal.

Wherein, the display panel is a self-luminous OLED display panel or a liquid crystal display panel requiring a backlight module; the cylindrical lens sheet is a cylindrical lens thin film, one side of the cylindrical lens sheet is an integrated flat surface, and the other side oppositely is a curved surface having multiple periodic cylindrical lenses arranged in parallel.

In a second aspect, the embodiment of the present invention provides a manufacturing equipment for a stereoscopic display comprising a searching module, a determination module and an alignment module, wherein: the searching module is composed of an imaging device to search alignment marks at non-display regions of a display panel and a cylindrical lens sheet; the determination module is used for determining a center coordinate of the display panel, a center coordinate of the cylindrical lens sheet, and an angle offset of the display panel and the cylindrical lens sheet; and the alignment module is used for using the center coordinate of the display panel and the center coordinate of the cylindrical lens sheet to perform a central assembling and aligning for the display panel and the cylindrical lens sheet; and for respectively rotating the display panel and the cylindrical lens sheet according to the angle offset in order to finish assembling and aligning of the display panel and the cylindrical lens sheet.

Wherein, each of the non-display region of the display panel and the non-display region of the cylindrical lens sheet includes six alignment marks, and the six alignment marks are respectively located at four terminals of diagonals and central positions of short edges of each of the display panel and the cylindrical lens sheet.

Wherein, the determination module includes a searching unit and a processing unit, and wherein: the searching unit is used for using the alignment imaging device to search two groups of the alignment marks at diagonal directions of each of the display panel and the cylindrical lens sheet; the processing unit is used for determining center points of the two groups of the alignment marks, and averaging coordinates of the center points of the two groups of the alignment marks in order to obtain first mark points; the searching unit is also used for searching the alignment marks at central positions of short edges of each of the display panel and cylindrical lens sheet, and using a center point between the alignment marks at central positions of the short edges of each of the display panel and cylindrical lens sheet as a second mark point; the processing unit is also used for averaging coordinates of the first mark points and the second mark points in order to obtain a center coordinate of the display panel and a center coordinate of the cylindrical lens sheet; and the processing unit is also used for determining two included angles between diagonals and long sides of the display panel and cylindrical lens sheet, and averaging the two included angles in order to obtain an angle offset.

Wherein, each of the alignment marks is a two-dimensional micro structure that has an optical contour enhancement character, or a metal mark adopting an opaque metal.

Wherein, the display panel is a self-luminous OLED display panel or a liquid crystal display panel requiring a backlight module; the cylindrical lens sheet is a cylindrical lens thin film, one side of the cylindrical lens sheet is an integrated flat surface, and the other side oppositely is a curved surface having multiple periodic cylindrical lenses arranged in parallel.

The beneficial effects of the present invention are: comparing to the conventional art, the present invention uses an alignment imaging device to search alignment marks at non-display regions of a display panel and a cylindrical lens sheet, determines a center coordinate of the display panel, a center coordinate of the cylindrical lens sheet, and an angle offset of the display panel and the cylindrical lens sheet, uses the center coordinate of the display panel and the center coordinate of the cylindrical lens sheet to perform a central assembling and aligning for the display panel and the cylindrical lens sheet, and respectively rotating the display panel and the cylindrical lens sheet according to the angle offset in order to finish assembling and aligning of the display panel and the cylindrical lens sheet. Through aligning of the diagonals at two terminals and the diagonal at the center of the cylindrical lens sheet and combining with a compensation technology of the angle, effectively solve the assembling and aligning problem of the cylindrical lens sheet with high ductility and the display panel, improving the assembling drift corresponding to a direction of a 3D display for left and right eyes, which can obviously improve the assembly precision, reduce crosstalk and improve the 3D display effect.

DETAILED DESCRIPTION OF THE PREFERRED EMBODIMENT

Figure 1:
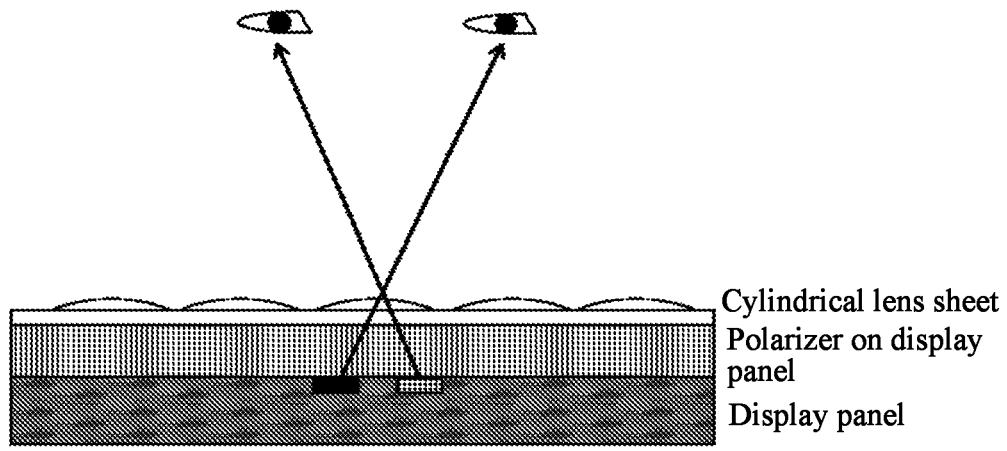
FIG. 1 is a schematic diagram of a naked-eye 3D display in the conventional art.
Figure 2:
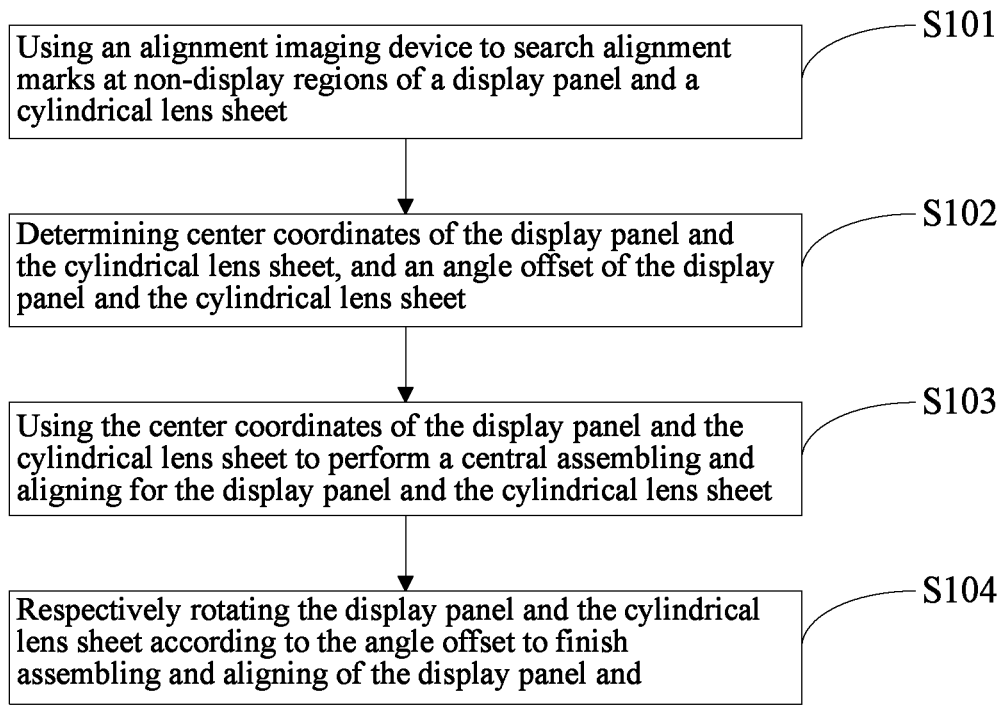
FIG. 2 is a flow chart of a method for aligning and assembling a stereoscopic display provided by an embodiment of the present invention.

With reference to FIG. 2, and FIG. 2 is a flow chart of a method for aligning and assembling a stereoscopic display provided by an embodiment of the present invention. As shown in FIG. 2, the method of the present embodiment includes following steps:

S101: using an alignment imaging device to search alignment marks at non-display regions of a display panel and a cylindrical lens sheet.

Wherein, in the embodiment of the present invention, the display panel is a self-luminous OLED display panel, or a liquid crystal display panel requiring a backlight module. The cylindrical lens sheet is a cylindrical lens thin film, and one side of the cylindrical lens sheet is an integrated flat surface, the other side oppositely is a curved surface having multiple periodic cylindrical lenses arranged in parallel. The base of cylindrical lens thin film is flexible and transparent material such as polyethylene terephthalate (PET), Amorphous Polyethylene Terephthalate (APET), Amorphous Polyethylene Terephthalate (APET), Polycarbonate (PC), Polymethyl Methacrylate (PMMA) or glass.

Wherein, in the present embodiment, the non-display region of the display panel includes six alignment marks, the non-display region of the cylindrical lens sheet also includes six alignment marks.

Figure 4:
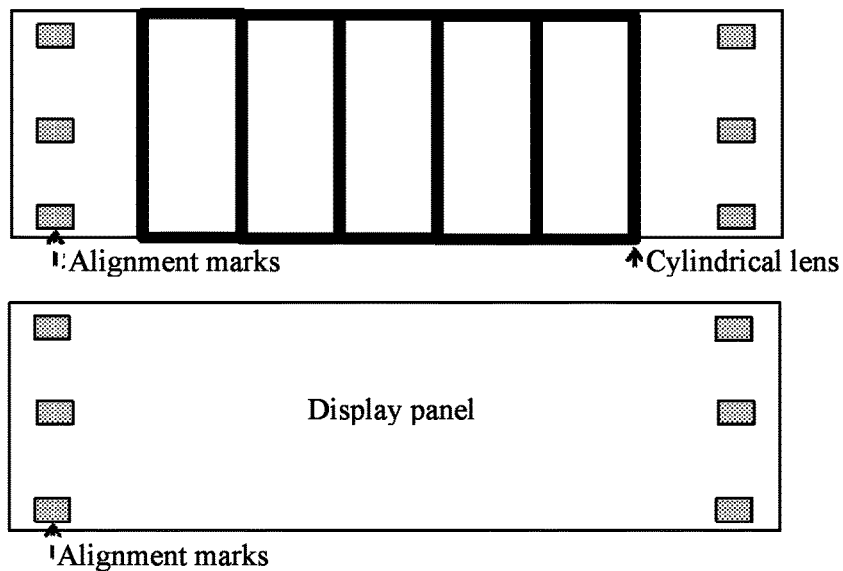
FIG. 4 is a schematic diagram of alignment marks at a non-display region of a display panel of an embodiment of the present invention.

In order to realize aligning and assembling along the left to right eyes direction, the alignment marks of the non-display regions of the display panel and the cylindrical lens sheet are respectively disposed at four terminals of diagonals and two central positions of short edges of each of the display panel and the cylindrical lens sheet, as shown in FIG. 4.

Wherein, each of the alignment marks is a two-dimensional micro structure that has an optical contour enhancement character, or a metal mark adopting an opaque metal, the present invention is not limited here. Besides, the shape of the alignment mark is not limited by the present invention. For example, square structure, T-type structure, the quartet ring structure, circular structure, ring structure, cross structure or reverse-cross structure, etc.

S102: determining a center coordinate of the display panel, a center coordinate of the cylindrical lens sheet, and an angle offset of the display panel and the cylindrical lens sheet.

Figure 3:
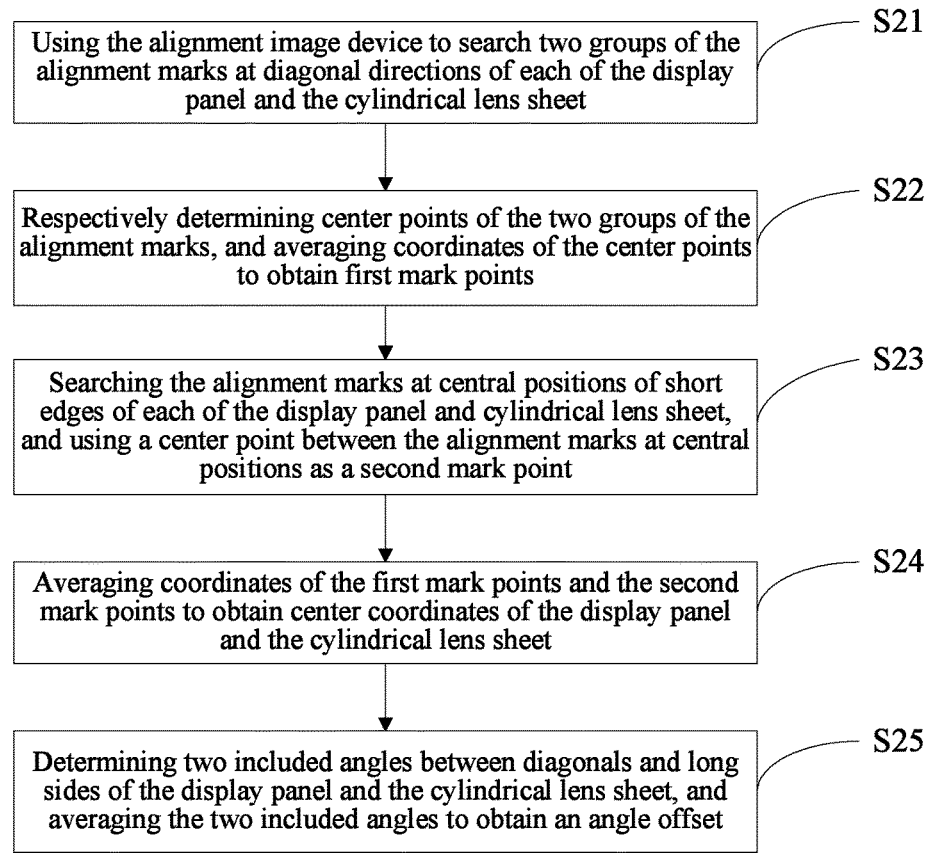
FIG. 3 is a flow chart of determining center coordinates and an angle offset of a display panel and a cylindrical lens sheet according to alignment marks in an embodiment of the present invention.

Wherein, with further reference to FIG. 3, the step of determining a center coordinate of the display panel, a center coordinate of the cylindrical lens sheet, and an angle offset of the display panel and the cylindrical lens sheet includes following sub-steps:

S21: using the alignment imaging device to search two groups of the alignment marks at diagonal directions of each of the display panel and the cylindrical lens sheet.

Here, the two groups of the alignment marks at diagonal directions of each of the display panel and the cylindrical lens sheet is using alignment marks respectively located at a lower left corner and an upper right corner as one group, and using alignment marks respectively located at an upper right corner and a lower left corner as one group.

S22: respectively determining center points of the two groups of the alignment marks, and averaging coordinates of the center points of the two groups of the alignment marks in order to obtain first mark points.

Respectively connecting the two groups of the alignment marks at diagonal directions, and respectively obtaining the center points of the alignment marks which are connecting at diagonal directions. Then, averaging the two center points in order to obtain the first mark point. The step of the averaging the center points is specifically realized by connecting two center points to form a connection line. Then, taking a center point of the connection line as the first mark point. Using the display panel as an example, with reference to FIG. 5, center points of the two groups of alignment marks at diagonal directions of the display panel are respectively a center point 1 and a center point 3. Averaging the center point 1 and the center point 3 to obtain a center point 2 as the first mark point of the present embodiment. The method for determining a first mark point of the cylindrical lens sheet is similar as above, no more repeating.

S23: searching the alignment marks at central positions of short edges of each of the display panel and cylindrical lens sheet, and using a center point between the alignment marks at central positions of the short edges of each of the display panel and cylindrical lens sheet as a second mark point.

Figure 6:
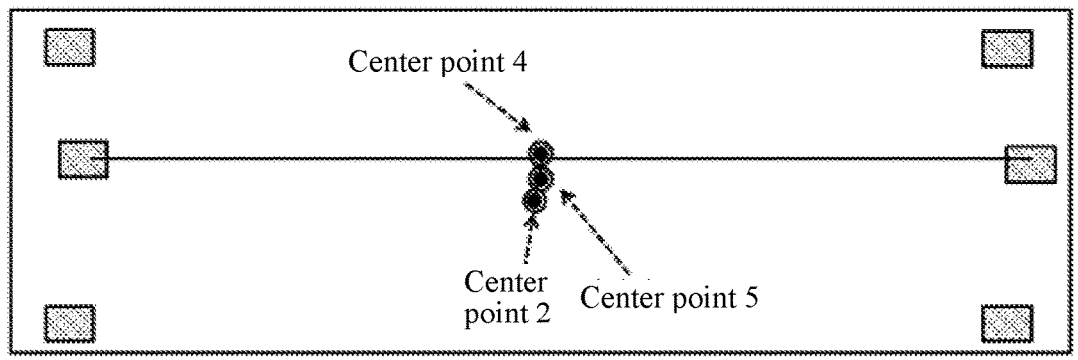
FIG. 6 is a schematic diagram of center points and a second mark point of the display panel.

Adopting an alignment imaging device to search a group of the alignment marks at central positions of short edges of the display panel, and using a center point of a connection line of the group of the alignment marks as the second mark point. As shown in FIG. 6, a center point 4 determined by the alignment marks at central positions of short edges of the display panel is the second mark point. The determination of the second mark point of the cylindrical lens sheet is similar as the above method, no more repeating.

S24: averaging coordinates of the first mark points and the second mark points in order to obtain a center coordinate of the display panel and a center coordinate of the cylindrical lens sheet.

Using the display panel as an example, for step of averaging the first mark point and the second mark point to obtain the center coordinate of the display panel, one realization method is connecting the two mark points, and taking a center point as the center coordinate of the display panel. As shown in FIG. 6, line connecting a center point 4 and the center point 2, and taking a coordinate of the center point 5 as the center coordinate of the display panel. A determination of the center coordinates of the cylindrical lens sheet is similar as above, no more repeating.

Step S25: determining two included angles between diagonals and long sides of the display panel and the cylindrical lens sheet, and averaging the two included angles in order to obtain an angle offset.

Figure 5:
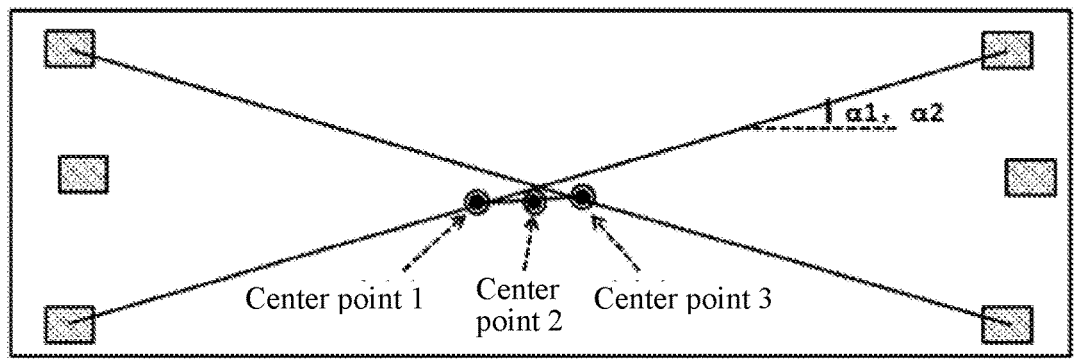
FIG. 5 is a schematic diagram of center points and a first mark point of the display panel.

The diagonal of the display panel means a connection line between the alignment marks at the diagonal direction of the display panel. The alignment marks at the diagonal can be any one group of the two groups of the alignment marks. As shown in FIG. 5, the alignment mark of the lower left corner and the alignment mark of the upper right corner are connected as the diagonal of the display panel, and forming an included angle $\alpha 1$ with a long side of the display panel.

Similarly, the diagonal of the cylindrical lens sheet means a connection line between the alignment marks at the diagonal direction of the cylindrical lens sheet. The alignment marks at the diagonal can be any one group of the two groups of the alignment marks. As shown in FIG. 5, the alignment mark of the lower left corner and the alignment mark of the upper right corner are connected as the diagonal of the cylindrical lens, and forming an included angle $\alpha 2$ with a long side of the cylindrical lens sheet.

Averaging the two included angles (the included angle between the diagonal and the long side of the display panel and the included angle between the diagonal and the long side of cylindrical lens sheet) means taking an average value of the two included angles. Adopting the average value as the angle offset of the display panel and the cylindrical lens sheet. For example, adopting $(\alpha 1+\alpha 2)/2$ as the angle offset of the display panel and the cylindrical lens sheet.

S103: using the center coordinate of the display panel and the center coordinate of the cylindrical lens sheet to perform a central assembling and aligning for the display panel and the cylindrical lens sheet.

S104: respectively rotating the display panel and the cylindrical lens sheet according to the angle offset in order to finish assembling and aligning of the display panel and the cylindrical lens sheet.

After performing the central assembling and aligning of the display panel and the cylindrical lens sheet, further combining the angle offset to rotating the display panel and the cylindrical lens sheet so as to finish the assembling and aligning of the display panel and the cylindrical lens sheet such that each cylindrical lens is corresponding to a left-eye image or a right-eye image.

The above is a detail description of the embodiment of the present invention. It can be understood that the present invention uses an alignment imaging device to search alignment marks at non-display regions of a display panel and a cylindrical lens sheet, determines a center coordinate of the display panel, a center coordinate of the cylindrical lens sheet, and an angle offset of the display panel and the cylindrical lens sheet, uses the center coordinate of the display panel and the center coordinate of the cylindrical lens sheet to perform a central assembling and aligning for the display panel and the cylindrical lens sheet, and respectively rotating the display panel and the cylindrical lens sheet according to the angle offset in order to finish assembling and aligning of the display panel and the cylindrical lens sheet. Through aligning of the diagonals at two terminals and the diagonal at the center of the cylindrical lens sheet and combining with a compensation technology of the angle, effectively solve the assembling and aligning problem of the cylindrical lens sheet with high ductility and the display panel, improving the assembling drift corresponding to a direction of a 3D display for left and right eyes, which can obviously improve the assembly precision, reduce crosstalk and improve the 3D display effect.

Figure 7:
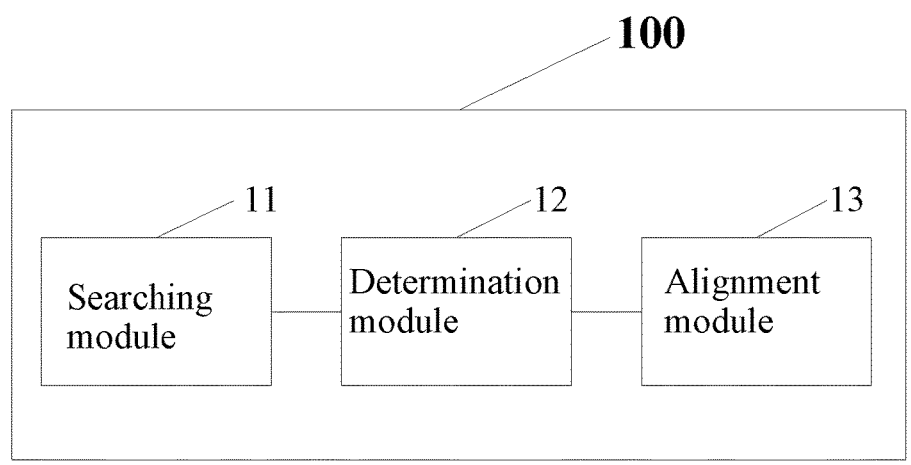
FIG. 7 is a schematic diagram of a manufacturing equipment for a stereoscopic display provided by the embodiment of the present invention.

With reference to FIG. 7, and FIG. 7 is a schematic diagram of a manufacturing equipment of a stereoscopic display provided by the embodiment of the present invention. The manufacturing equipment of the present embodiment is used for realizing the method of the embodiment shown in FIG. 2 and FIG. 3. As shown in FIG. 7, the manufacturing equipment 100 of the present embodiment includes searching module 11, a determination module 12 and an alignment module 13, wherein:

The searching module 11 is used for using an alignment imaging device to search alignment marks at non-display regions of a display panel and a cylindrical lens sheet.

Wherein, in the embodiment of the present invention, the display panel is a self-luminous OLED display panel, or a liquid crystal display panel requiring a backlight module. The cylindrical lens sheet is a cylindrical lens thin film, and one side of the cylindrical lens sheet is an integrated flat surface, the other side oppositely is a curved surface having multiple periodic cylindrical lenses arranged in parallel. The base of cylindrical lens thin film is flexible and transparent material such as polyethylene terephthalate (PET), Amorphous Polyethylene Terephthalate (APET), Amorphous Polyethylene Terephthalate (APET), Polycarbonate (PC), Polymethyl Methacrylate (PMMA) or glass.

Wherein, in the present embodiment, the non-display region of the display panel includes six alignment marks, the non-display region of the cylindrical lens sheet also includes six alignment marks.

In order to realize aligning and assembling along the left to right eyes direction, the alignment marks of the non-display regions of the display panel and the cylindrical lens sheet are respectively disposed at four terminals of diagonals and two central positions of short edges of each of the display panel and the cylindrical lens sheet.

Wherein, each of the alignment marks is a two-dimensional micro structure that has an optical contour enhancement character, or a metal mark adopting an opaque metal, the present invention is not limited here. Besides, the shape of the alignment mark is not limited by the present invention. For example, square structure, T-type structure, the quartet ring structure, circular structure, ring structure, cross structure or reverse-cross structure, etc.

the determination module 12 is used for determining a center coordinate of the display panel, a center coordinate of the cylindrical lens sheet, and an angle offset of the display panel and the cylindrical lens sheet.

Figure 8:
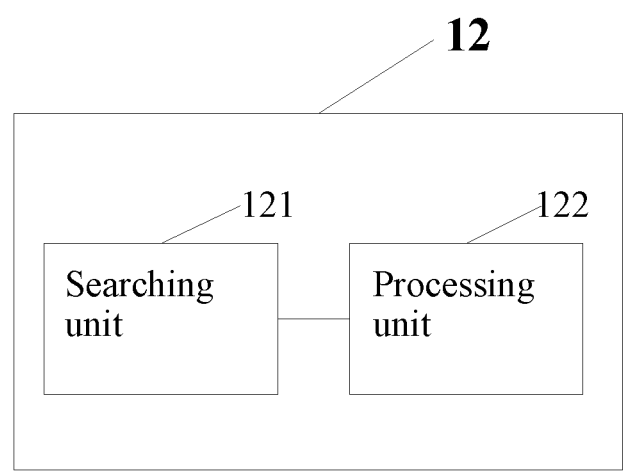
FIG. 8 is a schematic diagram of a determination module provided by an embodiment of the present invention.

With further reference to FIG. 8, and FIG. 8 is a schematic diagram of a determination module 12 provided by an embodiment of the present invention. As shown in the figure, the determination module 12 includes a searching unit 121 and a processing unit 122, wherein:

the searching unit 121 is used for using the alignment imaging device to search two groups of the alignment marks at diagonal directions of each of the display panel and the cylindrical lens sheet;

the processing unit 122 is used for determining center points of the two groups of the alignment marks, and averaging coordinates of the center points of the two groups of the alignment marks in order to obtain first mark points Here, the two groups of the alignment marks at diagonal directions of each of the display panel and the cylindrical lens sheet is using alignment marks respectively located at a lower left corner and an upper right corner as one group, and using alignment marks respectively located at an upper right corner and a lower left corner as one group.

the searching unit 121 is also used for searching the alignment marks at central positions of short edges of each of the display panel and cylindrical lens sheet, and using a center point between the alignment marks at central positions of the short edges of each of the display panel and cylindrical lens sheet as a second mark point.

Respectively connecting the two groups of the alignment marks at diagonal directions, and respectively obtaining the center points of the alignment marks which are connecting at diagonal directions. Then, averaging the two center points in order to obtain the first mark point. The step of the averaging the center points is specifically realized by connecting two center points to form a connection line. Then, taking a center point of the connection line as the first mark point.

the processing unit 122 is also used for averaging coordinates of the first mark points and the second mark points in order to obtain a center coordinate of the display panel and a center coordinate of the cylindrical lens sheet.

Adopting an alignment imaging device to search a group of the alignment marks at central positions of short edges of the display panel, and using a center point of a connection line of the group of the alignment marks as the second mark point.

the processing unit 122 is also used for determining two included angles between diagonals and long sides of the display panel and cylindrical lens sheet, and averaging the two included angles in order to obtain an angle offset The diagonal of the display panel means a connection line between the alignment marks at the diagonal direction of the display panel. The alignment marks at the diagonal can be any one group of the two groups of the alignment marks.

the alignment module 13 is used for using the center coordinate of the display panel and the center coordinate of the cylindrical lens sheet to perform a central assembling and aligning for the display panel and the cylindrical lens sheet; and for respectively rotating the display panel and the cylindrical lens sheet according to the angle offset in order to finish assembling and aligning of the display panel and the cylindrical lens sheet After performing the central assembling and aligning of the display panel and the cylindrical lens sheet, further combining the angle offset to rotating the display panel and the cylindrical lens sheet so as to finish the assembling and aligning of the display panel and the cylindrical lens sheet such that each cylindrical lens is corresponding to a left-eye image or a right-eye image.

The above is a detail description of the embodiment of the present invention. It can be understood that the present invention uses an alignment imaging device to search alignment marks at non-display regions of a display panel and a cylindrical lens sheet, determines a center coordinate of the display panel, a center coordinate of the cylindrical lens sheet, and an angle offset of the display panel and the cylindrical lens sheet, uses the center coordinate of the display panel and the center coordinate of the cylindrical lens sheet to perform a central assembling and aligning for the display panel and the cylindrical lens sheet, and respectively rotating the display panel and the cylindrical lens sheet according to the angle offset in order to finish assembling and aligning of the display panel and the cylindrical lens sheet. Through aligning of the diagonals at two terminals and the diagonal at the center of the cylindrical lens sheet and combining with a compensation technology of the angle, effectively solve the assembling and aligning problem of the cylindrical lens sheet with high ductility and the display panel, improving the assembling drift corresponding to a direction of a 3D display for left and right eyes, which can obviously improve the assembly precision, reduce crosstalk and improve the 3D display effect.

In the embodiments provided by the present invention, it can be understood, the system, device or method can be realized through other forms. For example, the device embodiment of the above description is only schematically, for example, the division of the module or unit is only a division of logic function. In a real application, another division method may be provided. For example, multiple units or modules can be combined or be integrated to another system, or some features can be ignored or not executed. Another point, the coupling, the direct coupling or communication connection discussed or displayed can be an indirectly coupling or indirectly communication through some ports, devices or units, which can be electrically, mechanically, or other forms.

The embodiments for describing the above devices are schematic, the unit illustrating as the separate components may be or may not be separated in Physics. The components for unit display may be or may not be a physical unit, that is, located at one place or distributed at multiple network units. According to an actual requirement, selecting portion of all modules to realize the purpose of the present embodiment.

Besides, every function unit in the embodiments of the present invention can be integrated into one processing unit, existed independently, or two or more be integrated in one unit. The integrated unit can adopt a hardware form to realize or in a software function unit form.

If the integrated circuit is realized by adopting a software function form selling and using as an independent product, the software product can be stored in a readable media of a computer. Base on the understanding, the nature of the above technology solution or the contribution part comparing with the prior art can be reflected in a software product form, and the software product can be stored in a computer or a readable media, including a computer device (can be a person computer, a server or a network device) or a processor that executing the method in each embodiment or part of the method in each embodiment. The readable media includes: U disk, movable hard disk, ROM (Read-Only Memory), RAM (Random Access Memory), disk or CD-ROM that store program codes.

The above embodiment does not constitute a limitation of the scope of protection of the present technology solution. Any modifications, equivalent replacements and improvements based on the spirit and principles of the above embodiments should also be included in the protection scope of the present technology solution.

What is claimed is:

1. A method for aligning and assembling a stereoscopic display, comprising:
    using an alignment imaging device to search alignment marks at non-display regions of a display panel and a cylindrical lens sheet;
    determining a center coordinate of the display panel, a center coordinate of the cylindrical lens sheet, and an angle offset of the display panel and the cylindrical lens sheet;
    using the center coordinate of the display panel and the center coordinate of the cylindrical lens sheet to perform a central assembling and aligning for the display panel and the cylindrical lens sheet; and
    respectively rotating the display panel and the cylindrical lens sheet according to the angle offset in order to finish assembling and aligning of the display panel and the cylindrical lens sheet.

2. The method according to claim 1, wherein, each of the non-display region of the display panel and the non-display region of the cylindrical lens sheet includes six alignment marks, and the six alignment marks are respectively located at four terminals of diagonals and central positions of short edges of each of the display panel and the cylindrical lens sheet.

3. The method according to claim 2, wherein, the step of determining a center coordinate of the display panel, a center coordinate of the cylindrical lens sheet, and an angle offset of the display panel and the cylindrical lens sheet comprises:
    using the alignment imaging device to search two groups of the alignment marks at diagonal directions of each of the display panel and the cylindrical lens sheet;
    respectively determining center points of the two groups of the alignment marks, and averaging coordinates of the center points of the two groups of the alignment marks in order to obtain first mark points;
    searching the alignment marks at central positions of short edges of each of the display panel and cylindrical lens sheet, and using a center point between the alignment marks at central positions of the short edges of each of the display panel and cylindrical lens sheet as a second mark point;
    averaging coordinates of the first mark points and the second mark points in order to obtain a center coordinate of the display panel and a center coordinate of the cylindrical lens sheet; and
    determining two included angles between diagonals and long sides of the display panel and cylindrical lens sheet, and averaging the two included angles in order to obtain an angle offset.

4. The method according to claim 1, wherein, each of the alignment marks is a two-dimensional micro structure that has an optical contour enhancement character, or a metal mark adopting an opaque metal.

5. The method according to claim 1, wherein, the display panel is a self-luminous OLED display panel or a liquid crystal display panel requiring a backlight module; the cylindrical lens sheet is a cylindrical lens thin film, one side of the cylindrical lens sheet is an integrated flat surface, and the other side oppositely is a curved surface having multiple periodic cylindrical lenses arranged in parallel.

6. A manufacturing equipment for a stereoscopic display comprising a searching module, a determination module and an alignment module, wherein:
    the searching module is used for using an alignment imaging device to search alignment marks at non-display regions of a display panel and a cylindrical lens sheet;
    the determination module is used for determining a center coordinate of the display panel, a center coordinate of the cylindrical lens sheet, and an angle offset of the display panel and the cylindrical lens sheet; and
    the alignment module is used for using the center coordinate of the display panel and the center coordinate of the cylindrical lens sheet to perform a central assembling and aligning for the display panel and the cylindrical lens sheet; and for respectively rotating the display panel and the cylindrical lens sheet according to the angle offset in order to finish assembling and aligning of the display panel and the cylindrical lens sheet.

7. The manufacturing equipment according to claim 6, wherein, each of the non-display region of the display panel and the non-display region of the cylindrical lens sheet includes six alignment marks, and the six alignment marks are respectively located at four terminals of diagonals and central positions of short edges of each of the display panel and the cylindrical lens sheet.

8. The manufacturing equipment according to claim 7, wherein, the determination module includes a searching unit and a processing unit, and wherein:
    the searching unit is used for using the alignment imaging device to search two groups of the alignment marks at diagonal directions of each of the display panel and the cylindrical lens sheet;
    the processing unit is used for determining center points of the two groups of the alignment marks, and averaging coordinates of the center points of the two groups of the alignment marks in order to obtain first mark points;
    the searching unit is also used for searching the alignment marks at central positions of short edges of each of the display panel and cylindrical lens sheet, and using a center point between the alignment marks at central positions of the short edges of each of the display panel and cylindrical lens sheet as a second mark point;

the processing unit is also used for averaging coordinates of the first mark points and the second mark points in order to obtain a center coordinate of the display panel and a center coordinate of the cylindrical lens sheet; and the processing unit is also used for determining two included angles between diagonals and long sides of the display panel and cylindrical lens sheet, and averaging the two included angles in order to obtain an angle offset.

9. The manufacturing equipment according to claim 6, wherein, each of the alignment marks is a two-dimensional micro structure that has an optical contour enhancement character, or a metal mark adopting an opaque metal.

10. The manufacturing equipment according to claim 6, wherein, the display panel is a self-luminous OLED display panel or a liquid crystal display panel requiring a backlight module; the cylindrical lens sheet is a cylindrical lens thin film, one side of the cylindrical lens sheet is an integrated flat surface, and the other side oppositely is a curved surface having multiple periodic cylindrical lenses arranged in parallel.

* * * * *